(12) United States Patent
Mirzendehdel et al.

(10) Patent No.: US 12,384,116 B2
(45) Date of Patent: Aug. 12, 2025

(54) AVOIDING TRAPPING UNUSED ADDITIVE MANUFACTURING MATERIALS DURING PRODUCTION

(71) Applicant: Palo Alto Research Center Incorporated, Palo Alto, CA (US)

(72) Inventors: Amirmassoud Mirzendehdel, Millbrae, CA (US); Morad Behandish, San Mateo, CA (US); Saigopal Nelaturi, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 495 days.

(21) Appl. No.: 17/816,483

(22) Filed: Aug. 1, 2022

(65) Prior Publication Data

US 2024/0033997 A1  Feb. 1, 2024

(51) Int. Cl.
*B29C 64/393* (2017.01)
*B29C 64/205* (2017.01)
*B29C 64/40* (2017.01)
*B33Y 50/02* (2015.01)
*B29C 64/153* (2017.01)
*B33Y 30/00* (2015.01)

(52) U.S. Cl.
CPC .......... *B29C 64/393* (2017.08); *B29C 64/205* (2017.08); *B29C 64/40* (2017.08); *B33Y 50/02* (2014.12); *B29C 64/153* (2017.08); *B33Y 30/00* (2014.12)

(58) Field of Classification Search
CPC ..... B29C 64/393; B29C 64/205; B29C 64/40; B29C 64/153; B29C 64/386; B33Y 50/02; B33Y 30/00; B33Y 10/00; B33Y 50/00; B22F 5/10; B22F 10/43; B22F 10/80; B22F 10/28; G06F 2113/10; G06F 2119/08; G06F 30/20; G06F 2119/18
USPC .......................................................... 700/119
See application file for complete search history.

(56) References Cited

U.S. PATENT DOCUMENTS

| 6,261,507 | B1 * | 7/2001 | Gigl ...................... G03F 7/0037 |
| | | | 264/401 |
| 11,580,279 | B1 * | 2/2023 | Pal ......................... B29C 64/386 |
| 2019/0076925 | A1 * | 3/2019 | Lakshman .............. B22F 10/80 |
| 2019/0351620 | A1 * | 11/2019 | Jaiswal ................... B22F 10/80 |

(Continued)

*Primary Examiner* — Chun Cao
*Assistant Examiner* — Michael Tang
(74) *Attorney, Agent, or Firm* — Womble Bond Dickinson (US) LLP

(57) ABSTRACT

The present disclosure provides techniques for analyzing trapped unused materials during AM. For example, given a geometry or shape to be manufactured using one or more AM materials, a tool path for solidifying the one or more AM materials is generated to turn the geometry into a physical object based on one or more manufacturing parameters related to AM resolutions. A processing device may compute a simulated manufactured geometry (e.g., a realistic representation of the actual shape of the corresponding physical object to be produced) based on the tool path and the one or more manufacturing parameters. The processing device analyzes the simulated manufactured geometry for a portion of removable AM materials trapped inside the simulated manufactured geometry. The processing device then generates a report regarding the portion of the removable AM materials trapped inside the simulated manufactured geometry.

13 Claims, 11 Drawing Sheets

(56) References Cited

U.S. PATENT DOCUMENTS

2021/0046710 A1* 2/2021 Koopmans ............. B33Y 10/00
2022/0193980 A1* 6/2022 Thomson ............. B29C 64/112

* cited by examiner

AVOIDING TRAPPING UNUSED ADDITIVE MANUFACTURING MATERIALS DURING PRODUCTION

TECHNICAL FIELD

Implementations of the present disclosure relate to additive manufacturing.

BACKGROUND

Additive manufacturing (often known as 3D printing, or referred to as printing) enables the production of structures that are complicated in shape and not achievable by subtractive manufacturing methods. For example, hollow structures that are expensive or difficult to achieve in machining processes (i.e., removal of materials by turning, drilling, and milling) may be created layer by layer in additive manufacturing. Many forms of additive manufacturing make use of transforming matters from one state to another, such as from liquid to solid, by chemical reactions, or by heat (e.g., melting materials at specific locations and solidifying when cooled).

Additive manufacturing often starts with a digital model of an object to be produced, the digital model represented by many points of known coordinates. The digital model often needs be converted into a set of instructions for a machine (e.g., 3D printer) to deposit or solidify materials (e.g., layer by layer) to produce the physical representation of the digital model. That is, given a digital model, the production process of additive manufacturing requires generating machine instructions based on various parameters about the machine and the materials, and then executing the instructions to complete the conversion from the given digital model to a real-life counterpart. Such complicated procedures often lead to production errors (e.g., differences between the produced object and the intended object of the digital model).

One error that may occur during such production steps is trapping unused materials that are supposed to be removed. For example, a component may include holes for fasteners, or cooling channels or conduits to enable fluids flowing therein. An error in selecting production parameters may result in the unused materials in the holes or channels trapped or clogged in the finished model, failing the intended purpose.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

Figure 1:
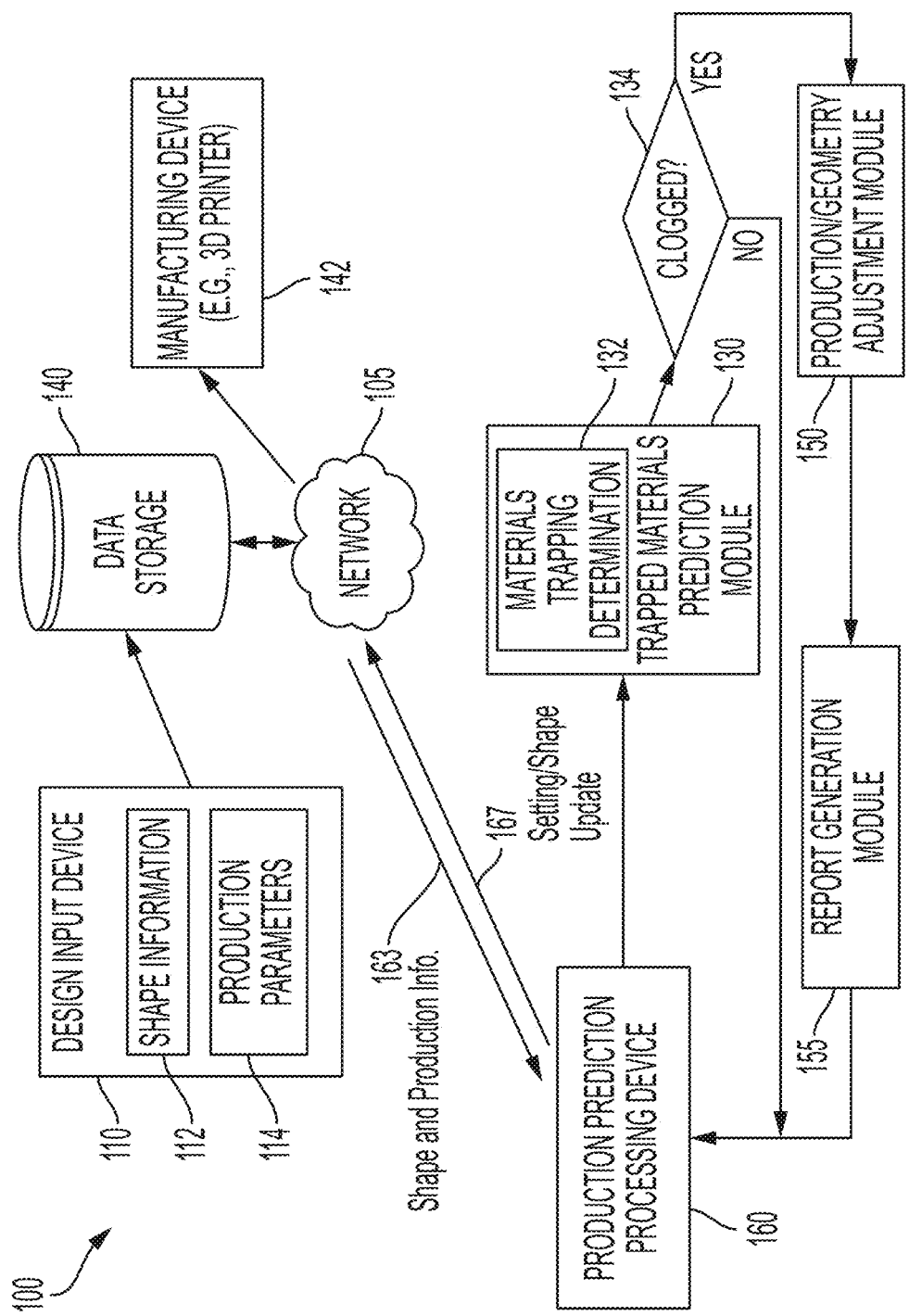
FIG. 1 illustrates a block diagram of a production defect prediction system for analyzing trapped unused materials during additive manufacturing (AM), in accordance with certain aspects of the present disclosure.

The present disclosure provides various techniques for analyzing trapped unused materials during additive manufacturing (AM). A digital model of a shape or geometry may be manufactured using various AM technologies (commonly known as 3D printing). The produced physical object, due to limited resolution (e.g., the finest feature that the AM technology can produce), will introduce errors that deviate from the digital model. For example, a digital model of a tetrahedron may include perfectly sharp edges intersected by two flat surfaces. During AM production however, both the edges and the surfaces will include variations (e.g., roughness) limited by the resolutions achievable or specified. The variations may be referred to as: under-deposition when the physical feature occupies a smaller volume than that specified in the digital model, or over-deposition when the physical feature occupies a greater volume than that specified in the digital model. Such variations may cause production issues, such as trapping unused AM materials that are supposed to be removed. The present disclosure provides methods and techniques to avoid trapping unused AM materials or to reduce the unused AM materials trapped.

The present disclosure provides techniques, apparatus, systems, processes, methods, and/or non-transitory computer-readable storage medium for analyzing trapped unused materials during AM. For example, given a geometry or shape to be manufactured using one or more AM materials, a tool path for solidifying the one or more AM materials is generated to turn the geometry into a physical object based on one or more manufacturing parameters related to AM resolutions. A processing device may compute a simulated manufactured geometry (e.g., a realistic representation of the actual shape of the corresponding physical object to be produced) based on the tool path and the one or more manufacturing parameters. The processing device analyzes the simulated manufactured geometry for a portion of removable AM materials trapped inside the simulated manufactured geometry. The processing device then generates a report regarding the portion of the removable AM materials trapped inside the simulated manufactured geometry.

In an example, the geometry for AM production may include any shape information, such as computer-aided design (CAD) models (e.g., in AutoCAD™, Solidworks™, STEP, VRML, IGES, or DXF formats), standard triangle language (STL) models or similar point cloud models (e.g., .obj, .x3d, files and the like), or files that can be converted to such files (e.g., .png image files with user-defined thickness information). The geometry or shape information may be used interchangeably herein, and referred to as a digital model, a model, a design, or an object.

The tool path may include any planned travel trajectory of mechanical or optical tools in AM production. For example, the tool path may include a travel of a focused laser dot, a pattern of light projection, or a nozzle that jets or deposits AM materials that solidify based on thermal properties or chemical reactions. These different examples of tool paths are applicable to respective AM technologies. For example, the travel of a focused laser dot is applicable to powder laser sintering of metal or plastic powders or photosensitive resin, while light projection (e.g., by masking a light source or direct light projection) is applicable to photosensitive resin AM technologies. As further discussed below, the tool path and the associated manufacturing parameters may determine various aspects of the physical object produced.

According to aspects of the present disclosure, the AM materials of concern may include at least one of meltable powders (such as metals or thermoplastics) or photosensitive liquids (e.g., resins that solidify when exposed to light of certain wavelengths). For example, the meltable powders may be arranged, in each layer, uniformly distributed across a thickness to be sintered by a traveling laser dot. The photosensitive liquids may also be arranged in thin layers inside a tank or vat to be selectively solidified by a moving laser dot or a pattern of light. During manufacturing, not all supplied AM materials will be solidified. The unused or non-solidified portion of the AM materials is meant to be removed from the solidified object. The present disclosure provides techniques for avoiding trapping the non-solidified AM materials in the object of design.

To determine when and where trapping of the non-solidified AM materials occurs, the processing device may compute and identify one or more over-deposited features based on the one or more manufacturing parameters related to the AM resolutions. An over-deposited feature refers to a produced shape feature that occupies a larger space or volume than a corresponding feature as designed or expressed in the digital model. For example, a tip of a tetrahedron is an infinitesimal convergence of three edges and occupies no space in the digital model. During AM, however, unlike subtractive manufacturing, the tip is often ignored and implied by materials deposited along the edges, or if preferably deposited (e.g., to allow subsequent subtractive manufacturing to realize the tip), represented by an over-deposition corresponding to the AM resolution (e.g., the smallest feature that the AM technology produces, such as a laser dot size or a layer thickness).

The processing device may then compare the one or more over-deposited features to a cavity threshold for releasing the portion of removable AM materials. In some cases, the over-deposited features may cause a clog by enclosing an opening of the simulated manufactured geometry to be less than an allowable opening threshold. The clog indicates trapping of the non-used AM materials. The processing device may report the clog to a user and provide one or more options for the user to change production parameters (e.g., printing resolution and/or orientation) or the simulated manufactured geometry. For example, an option may include modifying the geometry to be manufactured based on the simulated manufactured geometry and the portion of the removable AM materials trapped to avoid the clog using the manufacturing parameters related to AM resolutions, such that an updated simulated manufactured geometry of the modified geometry includes similar opening sizes at the one or more over-deposited features of the received geometry.

As further described in the present disclosure, the methods and techniques herein allow for users to be warned about potential clogs or trapping of non-used AM materials and take actions to revise production parameters or modify geometry input information. As such, complicated internal structural features (such as long cooling channels of irregular shapes) may be successfully produced without costly trial and error by actually producing the parts in the first place. This may also serve as a review tool for users to make design decisions specific to an AM technology of choice.

FIG. 1 illustrates a block diagram of a production defect prediction system 100 for analyzing trapped unused materials during AM, in accordance with certain aspects of the present disclosure. As shown, the production defect prediction system 100 includes a production prediction processing device 160, which may receive shape and production information 163 from the data storage 140 via the network 105. The production prediction processing device 160 may analyze and determine when unused AM materials are trapped in the produced object and provide optional production settings update and/or shape update 167 to the data storage 140. The updated production settings or shape information 167 may be sent to the manufacturing device 142 to be manufactured.

The shape information 112 and the production parameters 114 may be received at a design input device 110 and sent to the data storage 140. The design input device 110 may include any computational terminal, such as a standalone computational device that includes individual processing and storage capacities. The design input device 110 may receive various inputs from a user, such as geometry or shape information 112, and production parameters 114.

The shape information 112 may include digital models, such as computer-aided design (CAD) models (e.g., in AutoCAD™, Solidworks™, STEP, VRML, IGES, or DXF formats), standard triangle language (STL) models or similar point cloud models (e.g., .obj, .x3d, files and the like), or files that can be converted to such files (e.g., .png image files with user-defined thickness information). The shape information 112 may generally be referred to as a digital model, a model, a design, or an object.

The production parameters 114 may include settings of various aspects of producing the shape information 112 in relation to a production environment. For example, the production parameters 114 may include AM resolution settings, such as power and/or focal diameter of a laser dot, power and/or duration of light projection, dots per inch (dpi) of a jetting nozzle, or layer thickness, among other manufacturing parameters related to AM resolutions. The production parameters 114 may further include orientation information of the object relative to tool movements (directions of which may be referred to as production, manufacturing, or build directions). In some cases, the orientation of the object is relative to a build direction that next layers or additional materials are to be added. The production parameters 114 may further include various types of parameters depending on materials and the corresponding manufacturing techniques, as briefly discussed below.

In AM in general, layers of materials may be added along the build direction (e.g., starting from a build platform). Any material that may solidify into a controlled pattern may form each of the added layers, such as, for example, powder materials to be sintered at high temperatures, extrudable materials to be extruded and solidify, and photosensitive materials to be solidified from liquid by light.

Specifically, powder materials may include any pulverized materials, such as metal powders and powders of various thermoplastics. When locally heated, by a high power laser dot, for example, the powder materials melt and connect into a solitary piece. By controlling the production parameters 114, including power output, how fast the laser dot (or another heat source) is traveling, how big (or small) the laser dot is used, the size and density of the powder materials, the melting temperature, and other production parameters, a physical copy of the model can be produced. Selective laser sintering (SLS), selective laser melting (SLM), and laser powder bed fusion (LPBF) are examples of manufacturing techniques that use powder materials.

Extrudable materials may include various thermoplastic materials as well as edible materials such as sugar or ice cream, or materials such as sand or glass. Example thermal plastic materials may include acrylonitrile butadiene styrene (ABS), polylactic acid (PLA), polyethylene terephthalate glycol (PTEG), nylon, thermoplastic polyurethane (TPU), polycarbonate (PC), and any combination thereof. Fused deposition modeling (FDM) is an example AM technique applicable to use extrudable materials in AM processes. Extrudable materials may also include materials that solidify by chemical reactions, such as concrete, two-part epoxy, or the like.

During printing of the extrudable materials, a controlled portion of the extrudable materials is extruded and deposited onto a layer below (or the build plate when printing the first layer). The deposited portion is quickly cooled down to solidify, either by conducting the heat away through the layer below or transferring away by cool air created to surround the extrusion. Or, in case of curing or solidifying by chemical reactions, the extruded materials may solidify in an expected reaction time. By controlling the production parameters 114, such as the extrusion temperature, the cooling rate (or the solidifying rate), the extrusion rate, and other constraints (e.g., the width of the extrusion nozzle), parts of different materials and different strengths can be printed.

Photosensitive materials may include curable resin materials reactive to ultra-violet radiations at various wavelength ranges (e.g., 390-405 nm). During printing, each layer of photosensitive materials is exposed, either globally or locally, to a curing light source to transform from liquid to solid. In some examples, such as stereolithography (SLA) 3D printing or liquid crystal display (LCD) 3D printing, a tank or bath of the photosensitive materials may be disposed between a light source and a build platform. The light source may be a moving laser dot (e.g., in SLA) or a collimated beam filtered by an LCD. The initial layer may be created by having the build platform positioned adjacent to a transparent and flexible medium to produce a thin layer of the photosensitive materials in the liquid phase. The movement of the laser dot and the filtering pattern of the LCD creates the pattern for each layer.

Upon the initial layer solidifies, the build platform and the cured layer are moved away from the medium to allow the next layer of photosensitive materials in liquid phase to enter the gap between the platform and the medium. Layer by layer, the build platform moves away from the medium (and the light source) to form the model. In some examples, such as in "Polyjet" 3D printing, the photosensitive materials may be disposed directly by jetting (similar to jetting ink by inkjet printers) onto the previous layer or a build surface and then cured by a light source.

In some examples, a print head may extrude thick or viscous photosensitive materials that are cured by a light source carried by the print head. When the aforementioned techniques are used, the production parameters 114 may include various aspects of exposure (e.g., light power, rate of transmission, exposure time, etc.), pattern creation (e.g., laser dot size, LCD resolution, jetting resolution, etc.), and other system parameters (e.g., layer height, material properties, etc.).

The design input device 110 may provide the shape information 112 and the production parameters 114 to the data storage 140. The network 105 may, upon demand or request by a user, provide the shape and production parameter information from the data storage 140 to the manufacturing device 142.

The production prediction processing device 160 may obtain the shape and production information 163 from the data storage 140 and return the setting or shape update 167 based on the information 163 to improve various aspects of production, such as to avoid trapping unused AM materials. For example, the production prediction processing device 160 may analyze and identify when unused AM materials will be trapped inside the object to be produced. As aforementioned, due to different AM resolutions, over-deposition may occur and the actually produced shape features may be greater in volume than the corresponding features specified in the digital model. By providing early warning notice and/or options to update production or geometric aspects to avoid clogging or trapping, the prediction processing device 160 may prevent manufacturing failures. An example of over-deposition in AM is shown in FIGS. 3 and 4.

Figure 3:
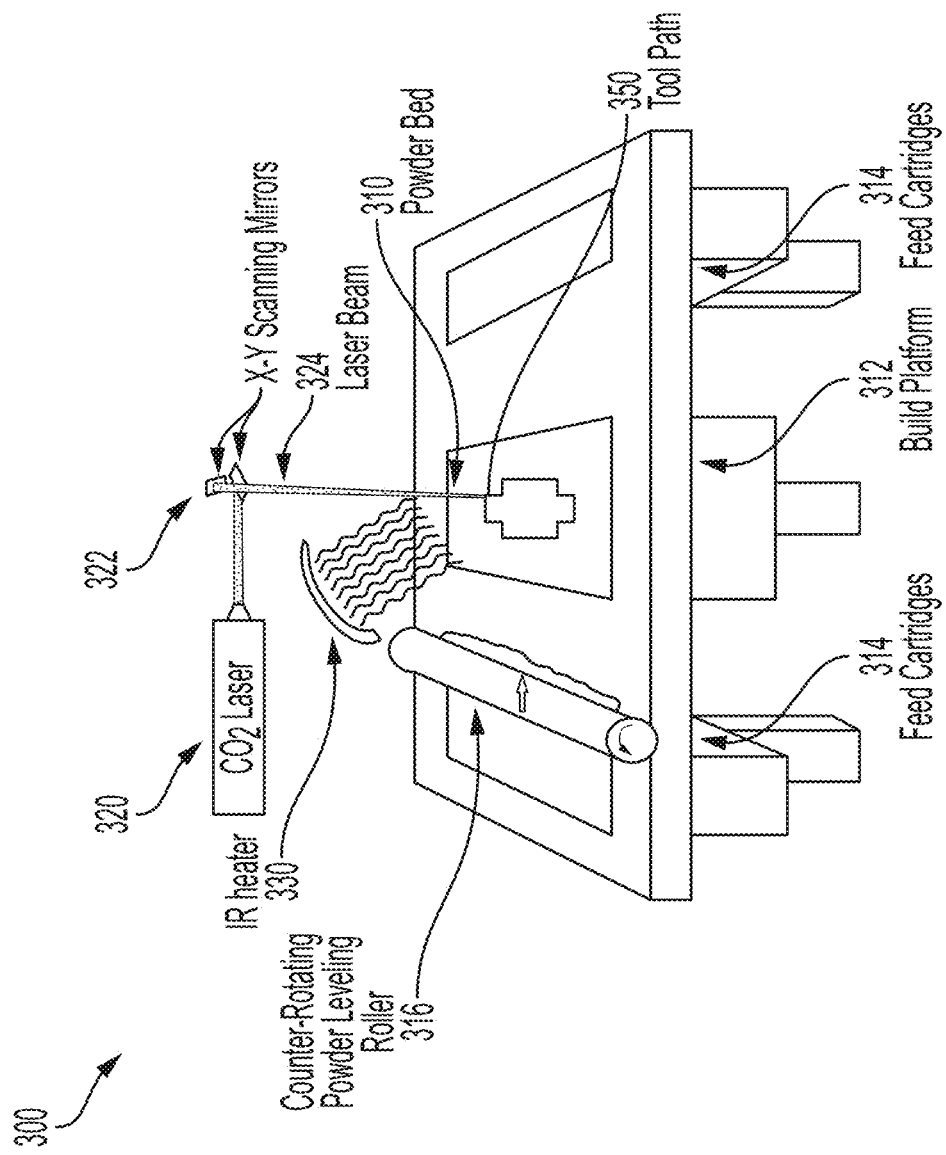
FIG. 3 illustrates an example of additive manufacturing system, in accordance with certain aspects of the present disclosure.

FIG. 3 illustrates an example AM system 300 using laser power to sinter AM materials from powders to designed shapes, in accordance with certain aspects of the present disclosure. As shown, FIG. 3 illustrates a general concept of LPBF, SLS, or SLM type of additive manufacturing process, which often includes a powder bed 310 on a build platform 312 for providing each layer to be sintered or fused according to designs. Feed cartridges 314 and the powder leveling roller 316 provide fresh powder for the next layer once the current layer formation has been completed. Each layer includes sintered AM materials and loose AM materials providing support for the next layer (and to be removed post-production).

A laser 320 directed by scanning mirrors 322 uses laser beams 324 to locally turn the powders into a continuous piece of solid along the tool path 350. The remaining powders not sintered by the laser 324 remain loose in the powder bed 310, serving as support for subsequent layers and to be removed post production. A radiator 330 provides heat to control the rate of cooling and heat treatment to the fused solid layer. According to the present disclosure, the production parameters may include the laser power sintering the AM materials, the travel speed of the laser, the laser dot diameter, among others. For example, a fine resolution may require a low input power (as the heat may dissipate to surrounding powders, resulting in a greater sintered grain than intended), a small laser dot diameter, and a rapid travel speed. However, the fine resolution is often in exchange with a longer production time and thus is not always desired. The tradeoff between resolution and production time leads to an optimization procedure for seeking a largest acceptable resolution that balances both the accuracy in representing the digital model and an efficient production period.

Figure 4:
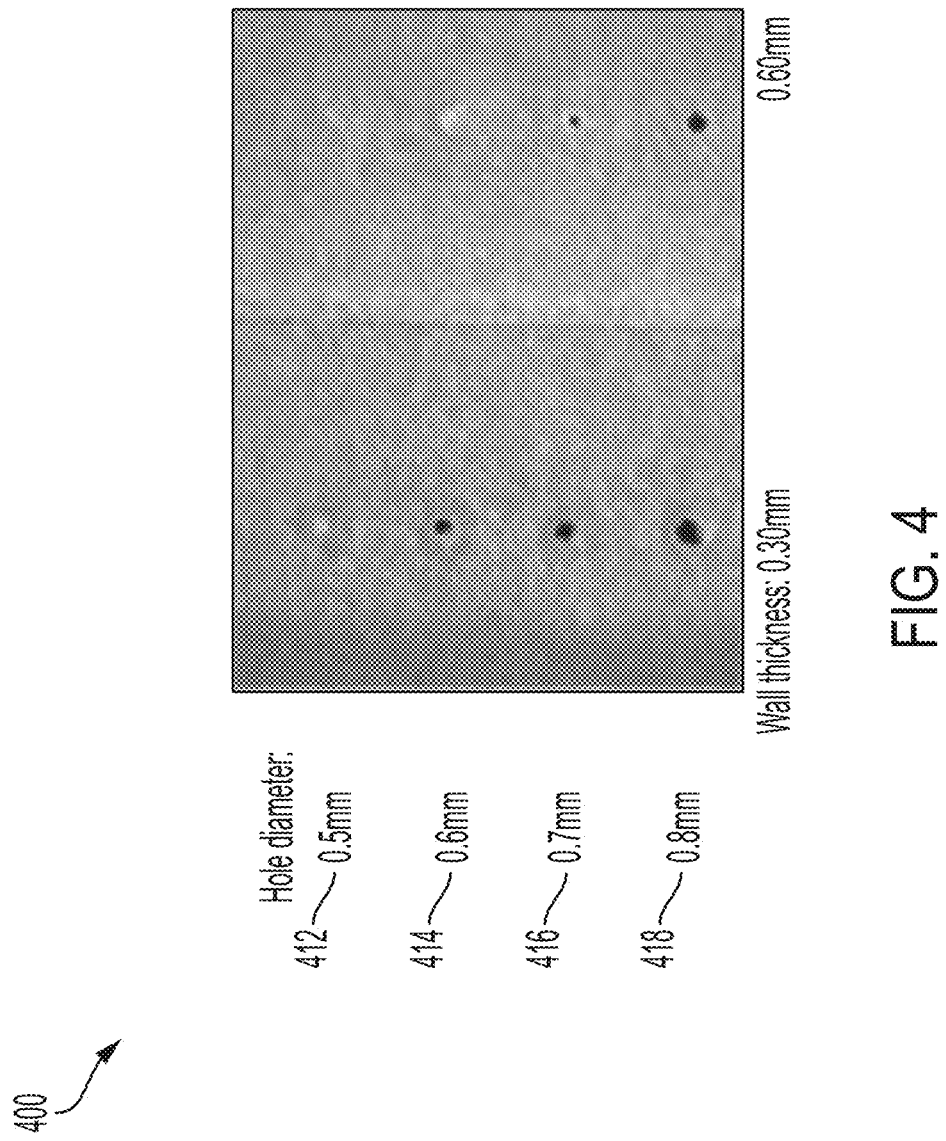
FIG. 4 illustrates an example of comparison of effects of deposition resolution during additive manufacturing, in accordance with certain aspects of the present disclosure.

The effect of selecting a larger resolution is shown in FIG. 4. As shown, the comparative example 400 includes production of four different holes 412, 414, 416, and 418 using two different wall thickness settings in LPBF. The diameters of the holes 412-418 are respectively: 0.5 mm, 0.6 mm, 0.7 mm, and 0.8 mm. When the wall thickness is set at 0.6 mm, the holes 412 and 414 are closed due to over-deposition, and the holes 416 and 418 result in smaller diameters than those specified. When the wall thickness is set at 0.3 mm, the hole 412 is also closed due to over-deposition. The present disclosure provides techniques for analyzing and updating production settings or geometry features to avoid such errors caused by over-deposition.

Returning to FIG. 1, the production prediction processing device 160 may perform computation and analysis with other processing modules, including trapped materials prediction module 130, the production/geometry adjustment module 150, and the report generation module 155. Although the processing modules 130, 150, and 155 are illustrated separated from the production prediction processing device 160, in various examples, the processing modules 130, 150, and 155 may be part of, or included in the production prediction processing device 160.

The trapped materials prediction module 130 may analyze and predict trapping of unused AM materials using the materials trapping determination component 132. For example, the trapped materials prediction module 130 may simulate a manufactured geometry and compare with the geometry of the corresponding digital model to identify over-deposition. When over-deposition occurs, the production prediction processing device 160 may determine, based on the over-deposition, whether openings in the manufactured geometry are clogged at the determination logic 134.

When the production prediction processing device 160 determines that one or more openings in the simulated manufactured geometry is clogged, the production prediction processing device 160 may use the production or geometry adjustment module 150 to propose adjustment options to reduce or avoid the clogging. For example, the production or geometry adjustment module 150 may seek different production parameters, such as different resolutions or orientations and analyze corresponding trapping of AM materials with the trapped materials prediction module 130. In another example, the production or geometry adjustment module 150 may identify geometric features corresponding to the clogging and propose options for updating dimensions or shapes for those geometric features to reduce or avoid trapping of AM materials.

The report generation module 155 may generate a report regarding the trapped AM materials in the simulated manufactured geometry and the options provided by the production or geometry adjustment module 150. For example, the report generation module 155 may generate a notification report to a user, providing analysis summary and indication of over-deposition locations that cause unused AM materials to be trapped. The notification report may include interactive options (e.g., buttons or links for the user to select) directed to the proposed adjustment options.

The user may select one of the adjustment options and inform the production prediction processing device 160 of the adjustments to be made to the production parameters or adjustments to the geometry. For example, a local over-deposition feature may be corrected by updating the geometry with a larger space dimension, such that produced object with over-deposition may result in the similar dimensions as what is represented in the original digital model, thus avoiding clogging.

When the production prediction processing device 160 determines that no clogging is expected based on the analysis by the trapped materials prediction module 130, the production prediction processing device 160 may accept the present production parameters.

Although the design input device 110 and the production prediction processing device 160 are illustrated as two separate devices, in some cases, the design input device 110 and the production prediction processing device 160 may be included in a same computational system (or two modules on a common computational platform). In some cases, the design input device 110 may have sufficient computational power to behave as the production prediction processing device 160, or the production prediction processing device 160 may include one or more user interfaces to receive direct input of modeling and production parameters therein.

In some cases, the design input device 110 may be a consumer terminal (e.g., a personal computer, a smart phone, etc.) that enables a user to upload designs and relevant information to the data storage 140. The production prediction processing device 160 may behave as a server performing requested services to modify or improve the shape and production information in the data storage 140, via the network 105. The data storage 140 may store production information separate from the design input device 110 (e.g., from the primary manufacturing device 142). The systems, techniques, and methods disclosed herein may therefore be applicable without a fixed terminal for the design input device 110, and rather, a flexible web-based service that connects user data, processing devices, and manufacturing devices in one production optimization environment.

Figures 1, 2:
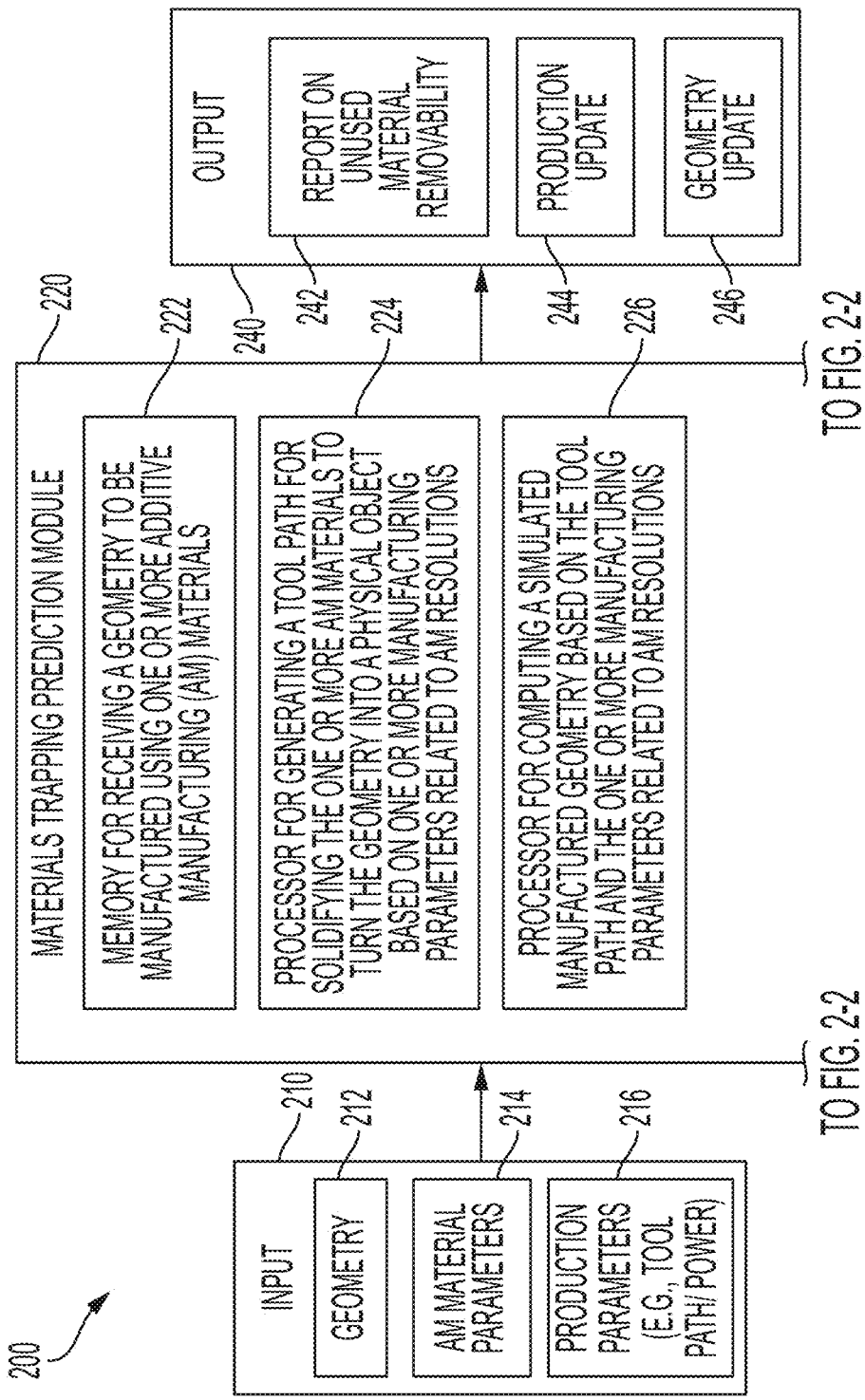
FIG. 2 illustrates a block diagram of data flow in predicting material trapping and avoidance thereof, in accordance with certain aspects of the present disclosure.
Figure 2:
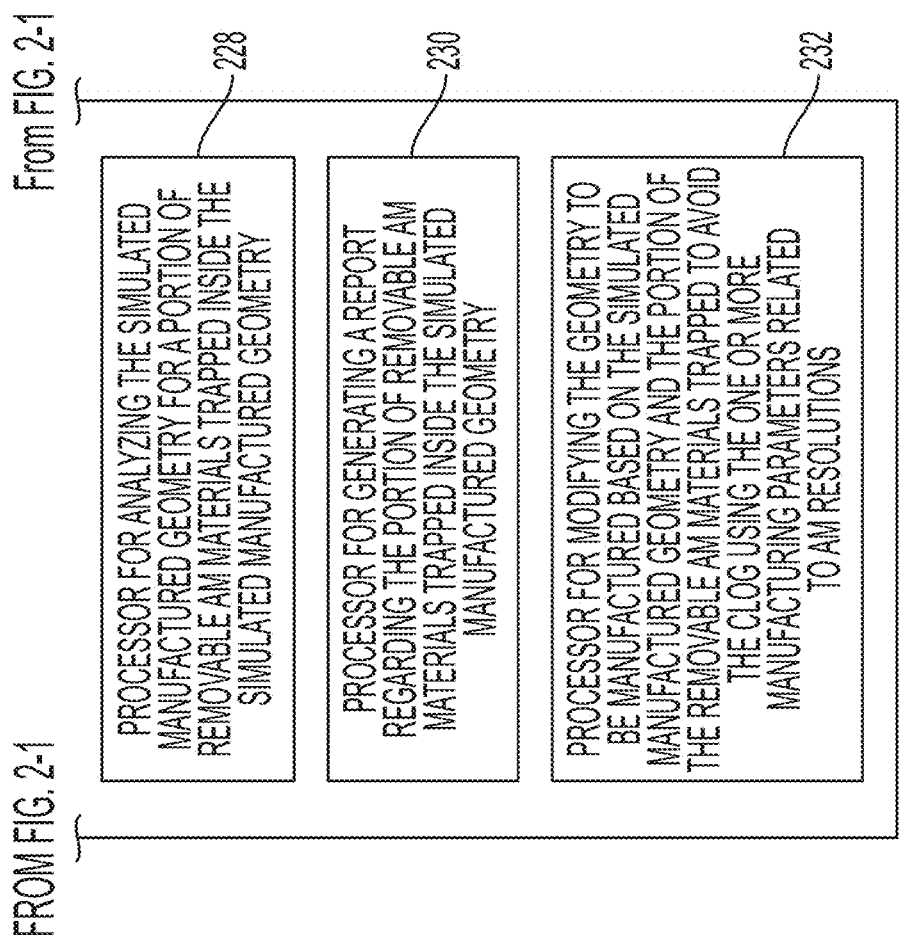

FIG. 2 illustrates a block diagram 200 of data flow in predicting material trapping and avoidance thereof, in accordance with certain aspects of the present disclosure. As shown, the input 210 is provided to the material trapping prediction module 220, which generates the output 240.

The input 210 may include geometry 212 of a shape of a model, one or more AM material parameters 214 (e.g., powder size, liquid viscosity, and other material properties that impact removability post production), and one or more production parameters 216 (e.g., the production parameters 114 described above, such as tool path and power input). The one or more production parameters 216 may specify AM resolutions, such as layer thickness. The one or more production parameters 216 may be associated with AM resolutions, such as input power, movement speed, feed or extrusion rate, and other aspects that may impact the resulting resolution causing over-deposition.

The materials trapping prediction module 220 may include a memory 222 for receiving a geometry to be manufactured using one or more AM materials. The materials trapping prediction module 220 may include a processor 224 for generating a tool path for solidifying the one or more AM materials to turn the geometry into a physical object based on one or more manufacturing parameters related to AM resolutions. For example, the tool path may include any planned travel trajectory of mechanical or optical tools in AM production. In LPBF, SLS, SLM, or SLA, the tool path may include a travel of a focused laser dot. In DLP or LCD, the tool path may include a pattern of light projection. In FDM or polyjet, the tool path may include a nozzle that jets or deposits AM materials that solidify based on thermal properties or chemical reactions.

The material trapping prediction module 220 may include a processor 226 for computing a simulated manufactured geometry based on the tool path and the one or more manufacturing parameters related to AM resolutions. The material trapping prediction module 220 may include a processor 228 for analyzing the simulated manufactured geometry for a portion of removable AM materials trapped inside the simulated manufactured geometry. The material trapping prediction module 220 may include a processor 230 for generating a report regarding the portion of removable AM materials trapped inside the simulated manufactured geometry. The material trapping prediction module 220 may further include a processor 232 for modifying the geometry to be manufactured based on the simulated manufactured geometry and the portion of the removable AM materials trapped to avoid the clog using the one or more manufacturing parameters related to AM resolutions.

Figure 7:
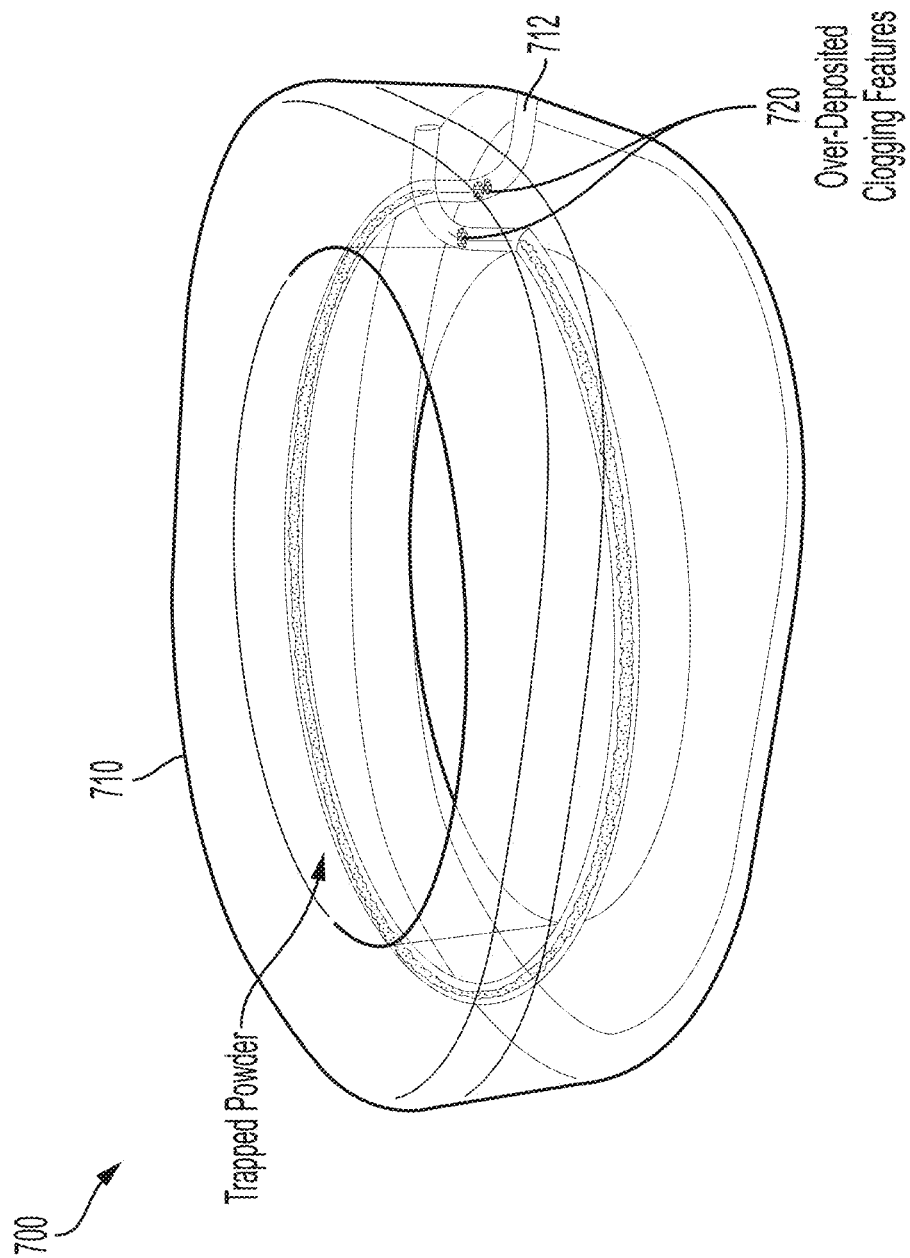
FIG. 7 illustrates an example prediction of unused materials trapped in the part, in accordance with certain aspects of the present disclosure.

The output 240 may include a report 242 summarizing status of unused AM material removability, a production update 244 indicating a change in production related aspects for reducing trapped unused AM materials, and a geometry update 246 indicating a change in geometric features for reducing trapped AM materials. For example, the output 240 may be presented to a user in a form of an interactive report on a display, including options in the forms of icons, links, or buttons. In some cases, the report may indicate that clogging of openings has been identified with the current production parameters 216 and illustrates a rendering of the simulated manufactured geometry (e.g., as shown in FIG. 7) with the trapped unused AM materials highlighted.

The report may also notify the user that one or more production parameters may be updated, such as by changing the manufacturing direction, wall thickness, and other settings related to printing resolutions. In addition, the report may present suggestions for updating geometric features to address clogging identified due to over-deposition.

Figure 5:
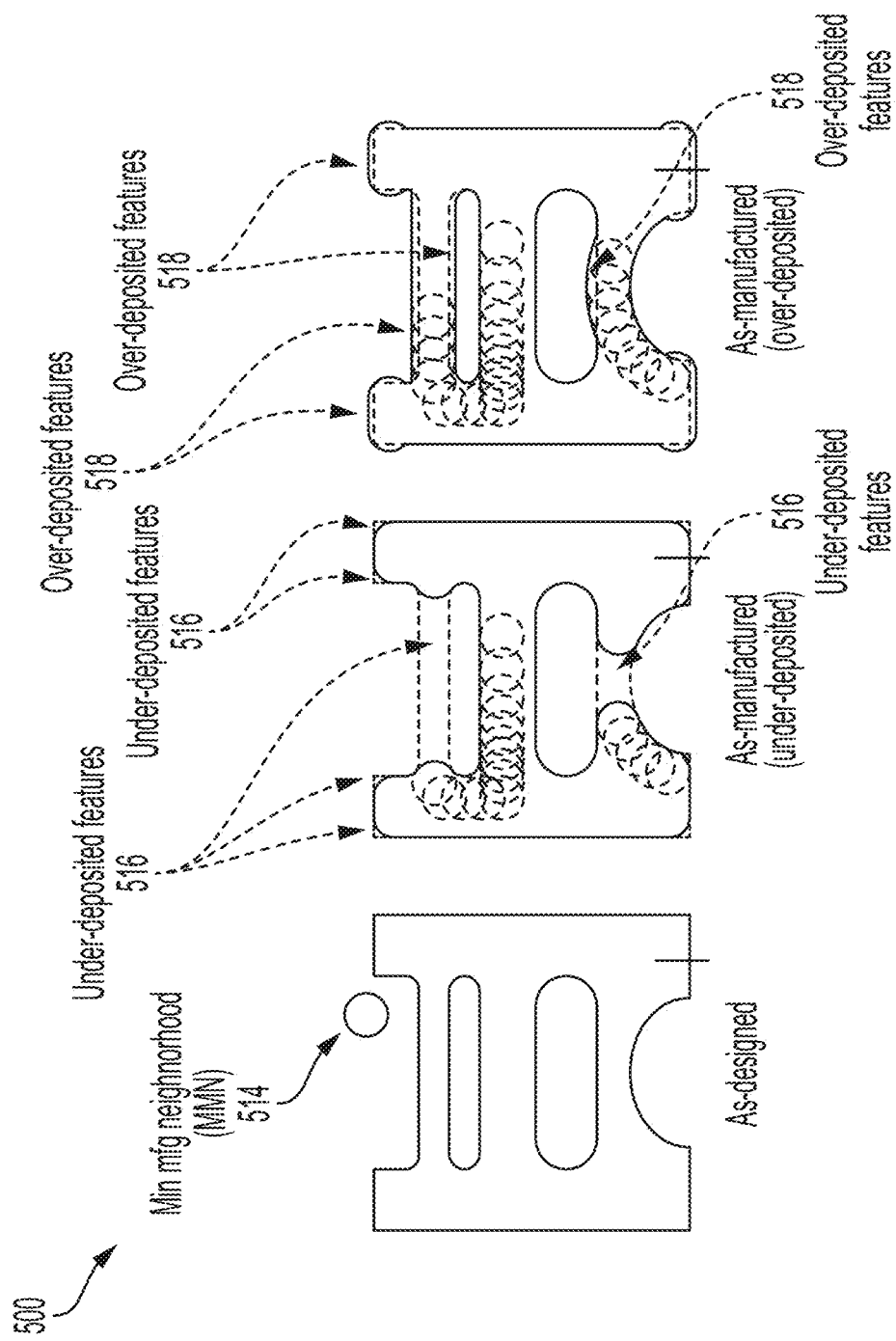
FIGS. 5A-5C illustrate examples of under-deposition and over-deposition occurring during production, in accordance with certain aspects of the present disclosure.

In some cases, the production parameter update may include setting selections for specific AM processes. For example, the user may select preferences for under-deposition or over-deposition for geometric features that cannot be accurately realized by AM. FIGS. 5A-5C illustrates examples 500 of under-deposition and over-deposition occurring during production.

As shown in FIG. 5A, a cross section of a digital model as designed is compared with a minimal manufacturing neighborhood (MMN) 514, corresponding to the AM resolution. In the example shown, the MMN 514 is larger in size than some of the features of the digital model. When the digital model is converted into a tool path for AM (also known as slicing), depending on slicing settings, either under-deposition or over-deposition may occur for those features that occupy volumes smaller than the MMN 514.

As shown in FIG. 5B, when under-deposition is used, as shown by the under-deposited features 516, the features 516 at issue will not be produced, resulting in unintended voids and spaces when the digital model is manufactured.

As shown in FIG. 5C, when over-deposition is used, as shown by the over-deposited features 518, the features at issue will be produced. However, because the MMN occupies a greater space than those features, the actually produced geometry will deviate from the as designed geometry, resulting in over-deposition. Over-deposition reduces dimensions of internal cavities (e.g., reducing the channel's cross sectional area as shown, compared to the as designed geometry). Therefore, over-deposition can cause clogging and trapping unused AM materials inside the part. Examples of avoiding such clogging or trapping are shown in FIGS. 6-8 and are discussed below.

Figure 6:
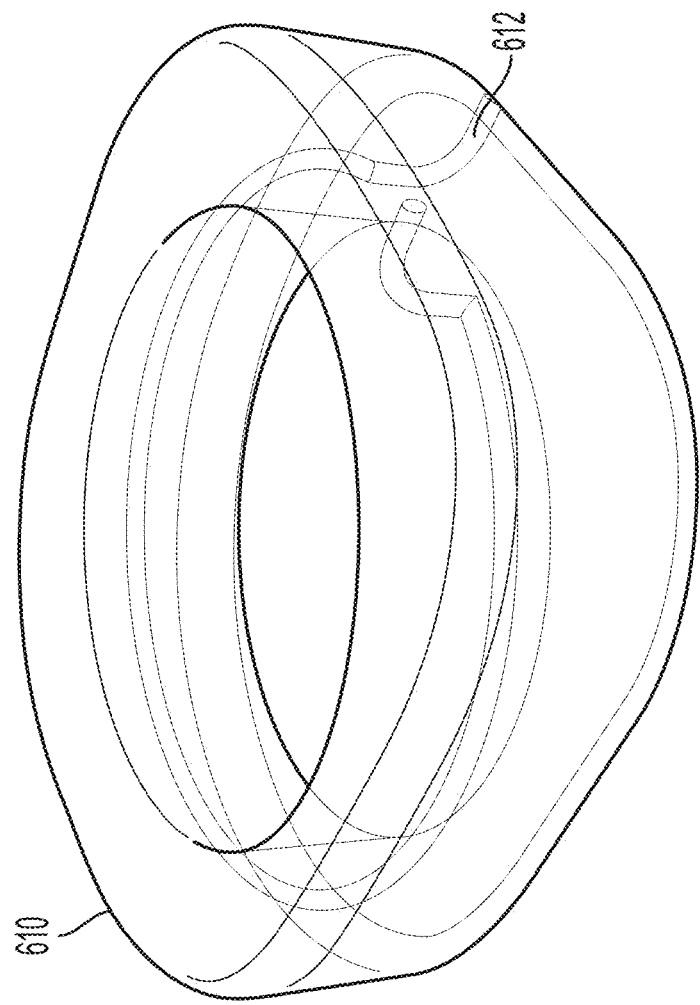
FIG. 6 illustrates an example part to be produced with a channel therein, in accordance with certain aspects of the present disclosure.

FIG. 6 illustrates an example part 600 to be produced with a channel 612 therein, in accordance with certain aspects of the present disclosure. As shown, the example part 600 includes a body 610 of irregular shape. The body 610 is to be manufactured using AM such as LPBF. The channel 612 allows coolant to travel through the body 610 during use. The example part 600 is a digital model as designed. According to aspects of the present disclosure, a processing device (such as the production prediction processing device 160) may compute a simulated manufactured geometry, such as the example part 700 shown in FIG. 7, for predicting how unused AM materials may be trapped inside the example part 600.

As shown in FIG. 7, the simulated body 710 includes clogging features 720 inside the channel 712 due to over-deposition. As such, unused powders are trapped by the clogging features 720 in the channel 712. For example, the clogging features 720 may include enclosed (or reduction in size) openings or cross sections due to the over-deposition and prevent the trapped powders from exiting the channel 712 post production. Although the example part 600 is illustrated to be produced using LPBF, other AM technologies of other AM materials may be used, such as SLA and liquid as the AM material. Based on the clogging features 720 caused by over-deposition, a processing device (such as the production prediction processing device 160) may update one or more production parameters or geometry features to reduce or avoid the clogging. An example of updating production parameters is shown in FIG. 8.

Figure 8:
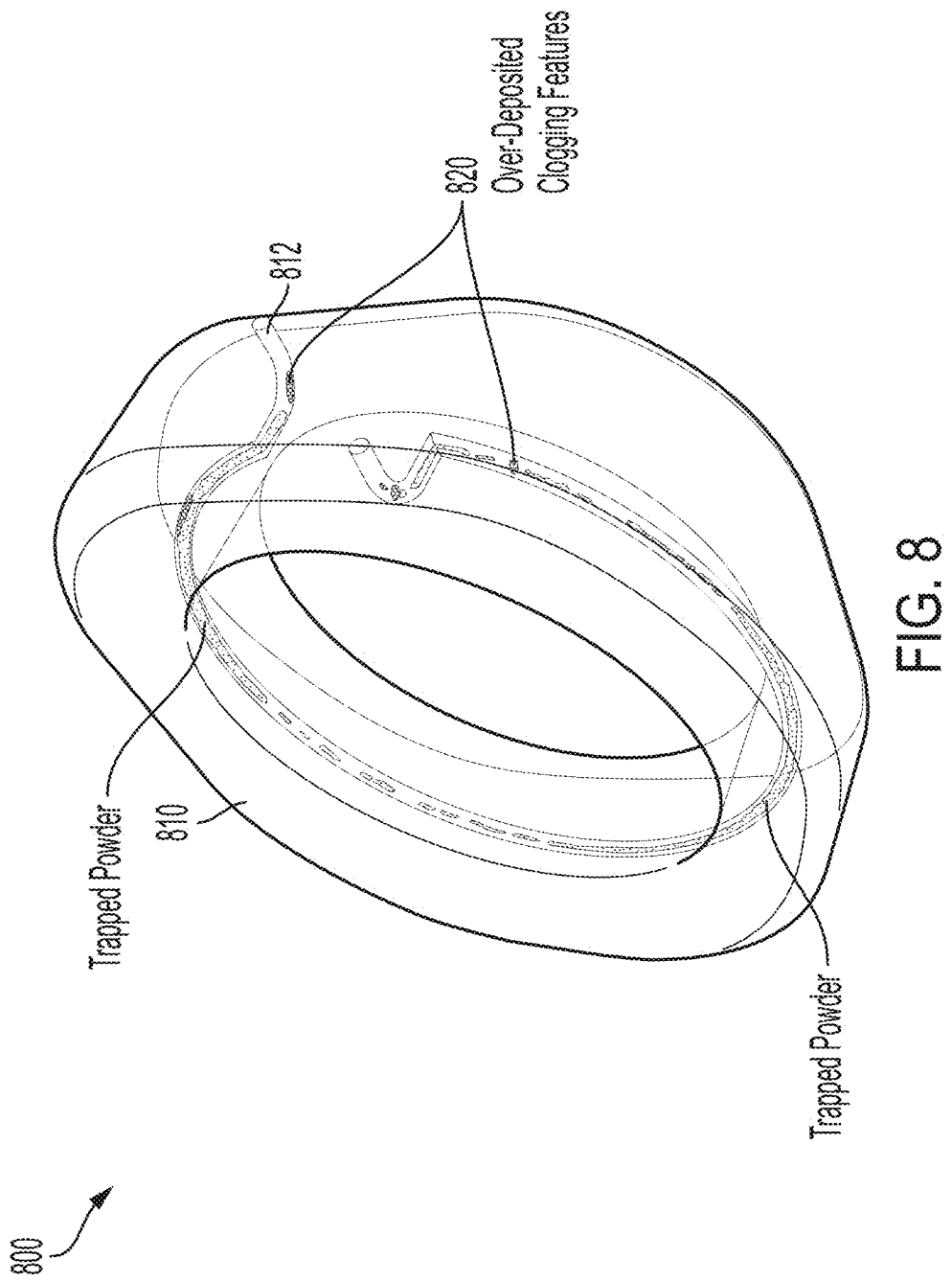
FIG. 8 illustrates an example prediction of a reduction of unused materials trapped in the part with updated production parameters, in accordance with certain aspects of the present disclosure.

FIG. 8 illustrates an example prediction 800 of a reduction of unused materials trapped in the part with updated production parameters, in accordance with certain aspects of the present disclosure. The body 810 of the updated simulated manufactured geometry and the channel 812 have different over-depositing features than those in FIG. 7. As shown, by changing the production direction, the original over-deposition features are removed. New over-depositing features 820 may take place at different locations. The processing device may consider different production directions and identify which orientation is corresponding to the least trapped AM materials. In some cases, when changing orientation (or any one production parameter) is insufficient to avoid the AM materials being trapped, other production parameters, such as printing resolution, may be considered and updated. In some cases, the geometric feature of the digital model corresponding to the clog may be updated, such as by increasing dimensions locally, to avoid clogging.

Figure 9:
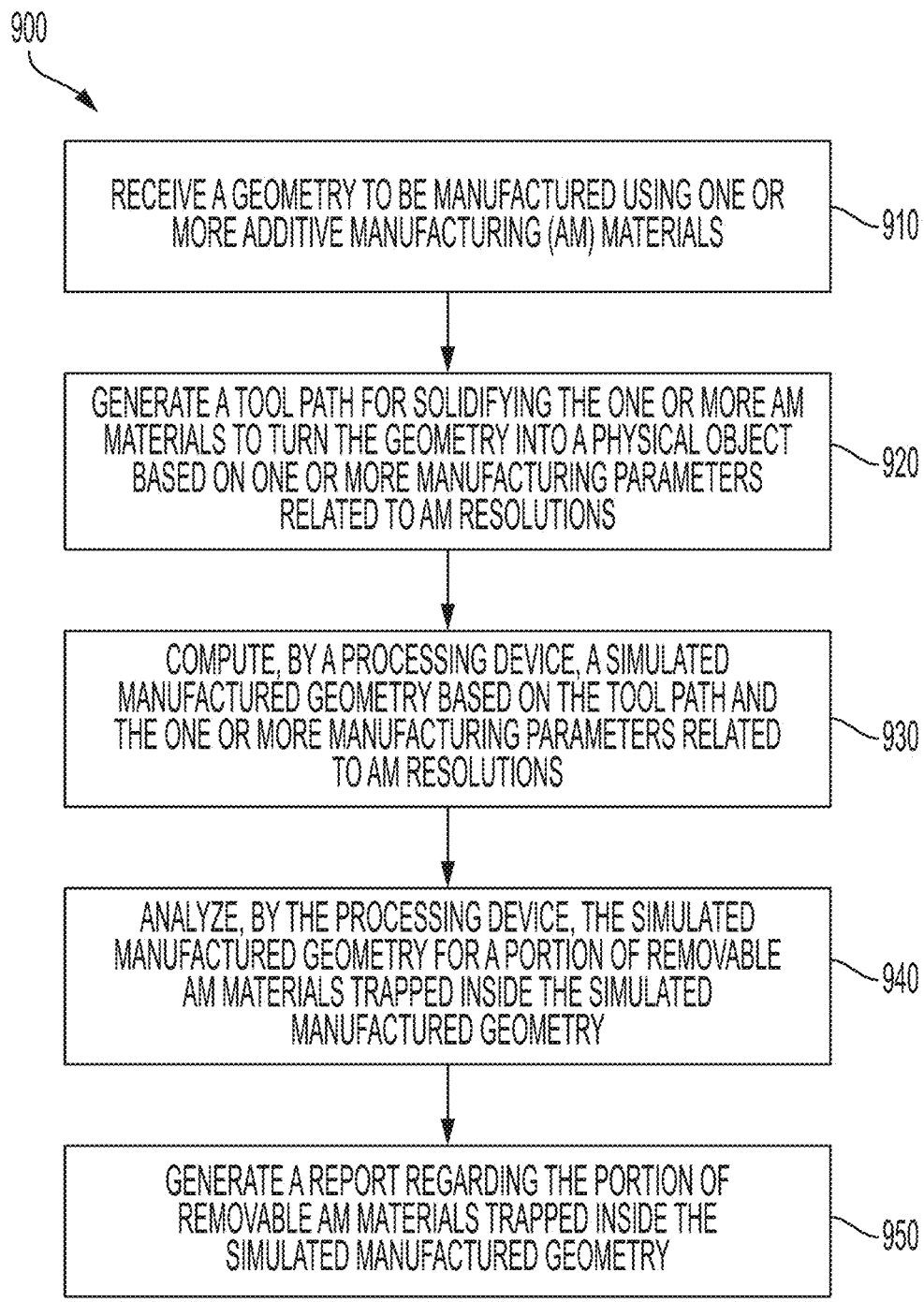
FIG. 9 illustrates a flow diagram of methods of operations, in accordance with certain aspects of the present disclosure.

FIG. 9 illustrates a flow diagram of methods of operations 900, in accordance with certain aspects of the present disclosure. The operations 900 may be performed by a processing device, such as the production prediction processing device 160 as described with reference to FIG. 1, or the materials trapping prediction module 220 of FIG. 2.

The operations 900 begins at 910, by receiving a geometry to be manufactured using one or more additive manufacturing (AM) materials. For example, the one or more AM materials may include meltable powders or photosensitive liquids.

At 920, a tool path is generated for solidifying the one or more AM materials to turn the geometry into a physical object based on one or more manufacturing parameters related to AM resolutions.

At 930, a processing device computes a simulated manufactured geometry based on the tool path and the one or more manufacturing parameters related to AM resolutions.

At 940, the processing device analyzes the simulated manufactured geometry for a portion of removable AM materials trapped inside the simulated manufactured geometry. For example, the portion of the removable AM materials comprises a non-solidified portion of the one or more AM materials.

At 950, a report is generated regarding the portion of the removable AM materials trapped inside the simulated manufactured geometry.

In aspects, analyzing the simulated manufactured geometry for the portion of removable AM materials trapped inside the simulated manufactured geometry may include computing one or more over-deposited features based on the one or more manufacturing parameters related to the AM resolutions; and comparing the one or more over-deposited features to a cavity threshold for releasing the portion of removable AM materials. The one or more over-deposited features cause a clog by enclosing an opening of the simulated manufactured geometry to be less than an allowable opening threshold.

In some cases, the processing device may modify the geometry to be manufactured based on the simulated manufactured geometry and the portion of the removable AM materials trapped to avoid the clog using the one or more manufacturing parameters related to AM resolutions. For example, modifying the geometry may include modifying the one or more over-deposited features based on the one or more manufacturing parameters such that an updated simulated manufactured geometry of the modified geometry includes similar opening sizes at the one or more over-deposited features of the received geometry.

In some cases, the processing device may update the simulated manufactured geometry using a different set of one or more manufacturing parameters related to AM resolutions. The one or more manufacturing parameters may include at least one of: a dimension parameter that changes a minimal solidification size, an input power parameter that changes a minimal solidification size, or an orientation of a manufacturing direction. In some cases, the processing device may modify the received geometry based on the simulated manufactured geometry and the portion of the removable AM materials trapped to avoid the clog using the different set of one or more manufacturing parameters, wherein the modifying is in response to a user command.

In some cases, the one or more AM materials may include fusible materials including at least a first material fusible at a first temperature, and a second, support, material fusible at a second temperature lower than the first temperature. For example, the second material may be a support material (e.g., wax) to be removed by heating post production. The portion of removal AM materials include a non-solidified portion of the first material and a portion of the second material to be liquefied at the second temperature. In some cases, the one or more AM materials may include a third material may be soluble in a solvent.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 10:
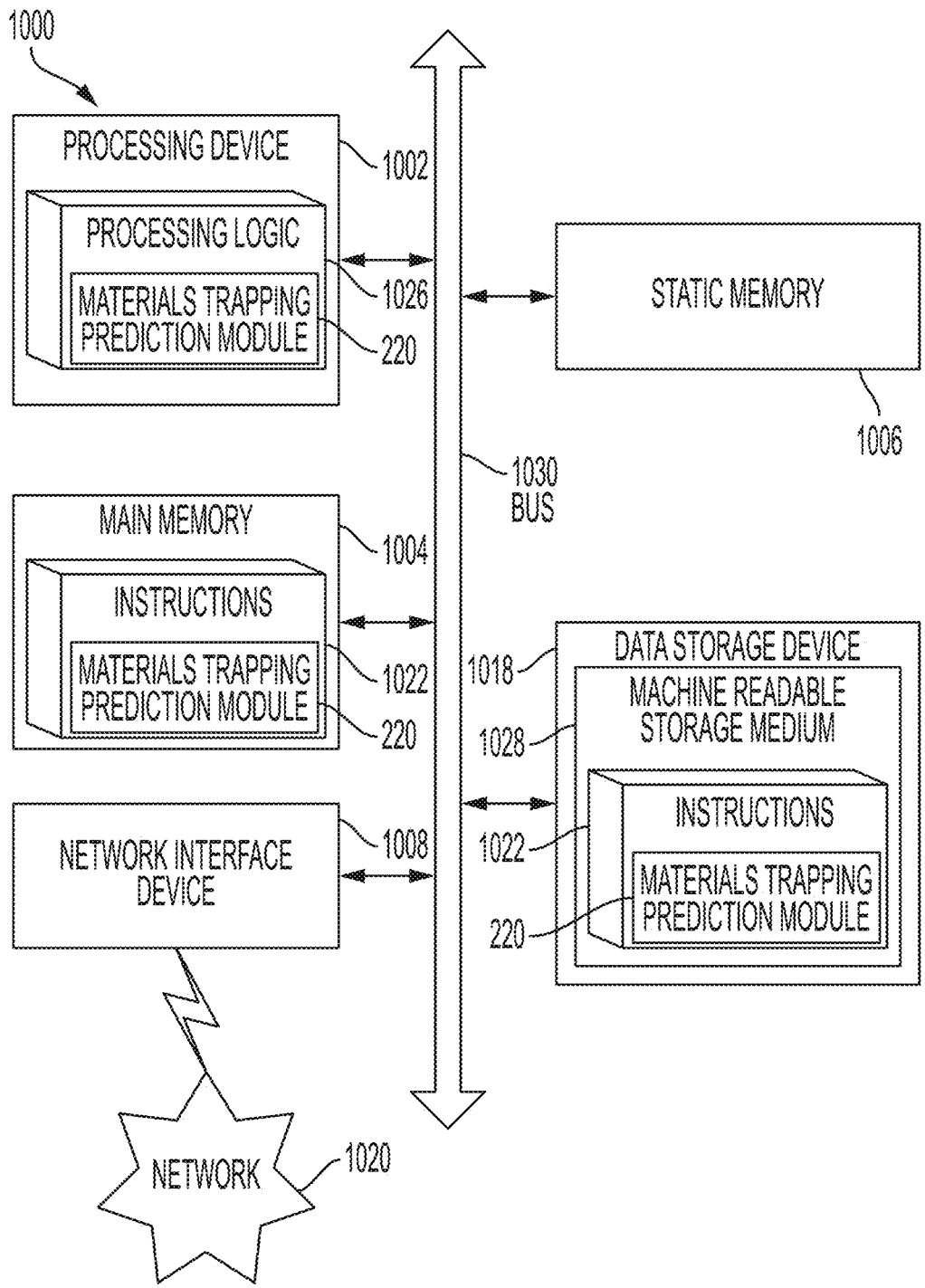
FIG. 10 illustrates an example computational device for performing operations of topology optimization, in accordance with certain aspects of the present disclosure.

FIG. 10 illustrates a diagrammatic representation of a machine in the example form of a computer system 1000 within which a set of instructions 1022, for causing the machine to perform any one or more of the methodologies discussed herein (such as the operations 900), may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server computer system, such as system 100.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. The processing device 1002 may be implemented as the materials trapping prediction module 220 or a related processing device unit (e.g., the production prediction processing device 160 of FIG. 1). In some cases, the processing device 1002 may be used to perform tasks associated with the materials trapping prediction module 220. Any of the signals provided over various buses described herein may be time multiplexed with other signals and provided over one or more common buses. Additionally, the inter 1029 connection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may execute processing logic 1026, which may be one example of system 100 shown in FIG. 1, for performing the operations and steps discussed herein. Although the processors are separately discussed or mentioned herein, the processors may be integrated or combined as a single processor device or system (e.g., system-on-a-chip, or SoC).

The data storage device 1018 may include a machine-readable storage medium 1028, on which is stored one or more set of instructions 1022 (e.g., software) embodying any one or more of the methodologies of functions described herein, including instructions to cause the processing device 1002 to execute system 100. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The non-transitory machine-readable storage medium 1028 may also be used to store instructions to perform the methods and operations described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method of additive manufacturing (AM), the method comprising:
    receiving a geometry to be manufactured using one or more AM materials;
    generating a tool path for solidifying the one or more AM materials to turn the geometry into a physical object based on one or more manufacturing parameters related to AM resolutions;
    computing, by a processing device, a simulated manufactured geometry based on the tool path and the one or more manufacturing parameters related to AM resolutions;
    analyzing, by the processing device, the simulated manufactured geometry for a portion of removable AM materials trapped inside the simulated manufactured geometry, wherein analyzing the simulated manufactured geometry for the portion of removable AM materials trapped inside the simulated manufactured geometry comprises:
        computing one or more over-deposited features based on the one or more manufacturing parameters related to the AM resolutions; and
        comparing the one or more over-deposited features to a cavity threshold for releasing the portion of removable AM materials, wherein the one or more over-deposited features cause a clog by enclosing an opening of the simulated manufactured geometry to be less than an allowable opening threshold;
    generating a report regarding the portion of removable AM materials trapped inside the simulated manufactured geometry;
    modifying the geometry to be manufactured based on the simulated manufactured geometry and the portion of the removable AM materials trapped to avoid the clog using the one or more manufacturing parameters related to AM resolutions; and
    controlling the AM based on the modified geometry.

2. The method of claim 1, wherein:
the one or more AM materials comprises at least one of: meltable powders or photosensitive liquids, and
the portion of removable AM materials comprises a non-solidified portion of the one or more AM materials.

3. The method of claim 1, wherein:
the one or more AM materials comprise fusible materials comprising at least a first material fusible at a first temperature, and a second, support, material fusible at a second temperature lower than the first temperature, and
the portion of removal AM materials comprises a non-solidified portion of the first material and a portion of the second material to be liquefied at the second temperature.

4. The method of claim 1, wherein modifying the geometry comprises modifying the one or more over-deposited features based on the one or more manufacturing parameters such that an updated simulated manufactured geometry of the modified geometry includes similar opening sizes at the one or more over-deposited features of the received geometry.

5. The method of claim 1, further comprising:
updating the simulated manufactured geometry using a different set of one or more manufacturing parameters related to AM resolutions, wherein the one or more manufacturing parameters comprise at least one of: a dimension parameter that changes a minimal solidification size, an input power parameter that changes a minimal solidification size, or an orientation of a manufacturing direction.

6. The method of claim 5, further comprising:
modifying the received geometry based on the simulated manufactured geometry and the portion of the removable AM materials trapped to avoid the clog using the different set of one or more manufacturing parameters, wherein the modifying is in response to a user command.

7. An apparatus for additive manufacturing (AM), the apparatus comprising:
a memory;
a processing device unit operatively coupled to the memory, the processing device unit to:
receive a geometry to be manufactured using one or more AM materials;
generate a tool path for solidifying the one or more AM materials to turn the geometry into a physical object based on one or more manufacturing parameters related to AM resolutions;
compute, by a processing device, a simulated manufactured geometry based on the tool path and the one or more manufacturing parameters related to AM resolutions;
analyze, by the processing device, the simulated manufactured geometry for a portion of removable AM materials trapped inside the simulated manufactured geometry by:
computing one or more over-deposited features based on the one or more manufacturing parameters related to the AM resolutions; and
comparing the one or more over-deposited features to a cavity threshold for releasing the portion of removable AM materials, wherein the one or more over-deposited features cause a clog by enclosing an opening of the simulated manufactured geometry to be less than an allowable opening threshold;
generate a report regarding the portion of removable AM materials trapped inside the simulated manufactured geometry;
modify the geometry to be manufactured based on the simulated manufactured geometry and the portion of the removable AM materials trapped to avoid the clog using the one or more manufacturing parameters related to AM resolutions; and
control the AM based on the modified geometry.

8. The apparatus of claim 7, wherein:
the one or more AM materials comprises at least one of: meltable powders or photosensitive liquids, and
the portion of removable AM materials comprises a non-solidified portion of the one or more AM materials.

9. The apparatus of claim 7, wherein:
the one or more AM materials comprise fusible materials comprising at least a first material fusible at a first temperature, and a second, support, material fusible at a second temperature lower than the first temperature, and
the portion of removal AM materials comprises a non-solidified portion of the first material and a portion of the second material to be liquefied at the second temperature.

10. The apparatus of claim 7, wherein the processing device is to modify the geometry by modifying the one or more over-deposited features based on the one or more manufacturing parameters such that an updated simulated manufactured geometry of the modified geometry includes similar opening sizes at the one or more over-deposited features of the received geometry.

11. The apparatus of claim 7, wherein the processing device is further to:
update the simulated manufactured geometry using a different set of one or more manufacturing parameters related to AM resolutions, wherein the one or more manufacturing parameters comprise at least one of: a dimension parameter that changes a minimal solidification size, an input power parameter that changes a minimal solidification size, or an orientation of a manufacturing direction.

12. The apparatus of claim 11, wherein the processing device is further to:
modify the received geometry based on the simulated manufactured geometry and the portion of the removable AM materials trapped to avoid the clog using the different set of one or more manufacturing parameters, wherein the modifying is in response to a user command.

13. A non-transitory computer-readable storage medium having instructions stored thereon that, when executed by a processing device for additive manufacturing (AM), cause the processing device to:
receive a geometry to be manufactured using one or more AM materials;
generate a tool path for solidifying the one or more AM materials to turn the geometry into a physical object based on one or more manufacturing parameters related to AM resolutions;
compute, by a processing device, a simulated manufactured geometry based on the tool path and the one or more manufacturing parameters related to AM resolutions;
analyze, by the processing device, the simulated manufactured geometry for a portion of removable AM materials trapped inside the simulated manufactured geometry by:

computing one or more over-deposited features based on the one or more manufacturing parameters related to the AM resolutions; and comparing the one or more over-deposited features to a cavity threshold for releasing the portion of removable AM materials, wherein the one or more over-deposited features cause a clog by enclosing an opening of the simulated manufactured geometry to be less than an allowable opening threshold;

generate a report regarding the portion of removable AM materials trapped inside the simulated manufactured geometry;

modify the geometry to be manufactured based on the simulated manufactured geometry and the portion of the removable AM materials trapped to avoid the clog using the one or more manufacturing parameters related to AM resolutions; and control the AM based on the modified geometry.

* * * * *